United States Patent
Gabrys

(10) Patent No.: US 9,677,684 B2
(45) Date of Patent: Jun. 13, 2017

(54) METHOD FOR MONITORING GAS INSTALLATION

(71) Applicant: AIUT Sp. z o. o., Gliwice (PL)

(72) Inventor: Marek Gabrys, Gliwice (PL)

(73) Assignee: AIUT Sp. z o. o., Gliwice (PL)

( * ) Notice: Subject to any disclaimer, the term of this patent is extended or adjusted under 35 U.S.C. 154(b) by 85 days.

(21) Appl. No.: 14/604,343

(22) Filed: Jan. 23, 2015

(65) Prior Publication Data

US 2016/0084404 A1 Mar. 24, 2016

(30) Foreign Application Priority Data

Sep. 23, 2014 (EP) .................................. 14461569

(51) Int. Cl.
| | | |
|---|---|---|
| *F17D 1/16* | (2006.01) | |
| *F16K 37/00* | (2006.01) | |
| *F16K 11/02* | (2006.01) | |
| *F16K 31/50* | (2006.01) | |
| *G01D 5/20* | (2006.01) | |

(52) U.S. Cl.
CPC .......... *F16K 37/0008* (2013.01); *F16K 11/02* (2013.01); *F16K 31/50* (2013.01); *F16K 37/0033* (2013.01); *F16K 37/0041* (2013.01); *G01D 5/20* (2013.01); *Y10T 137/0396* (2015.04); *Y10T 137/2569* (2015.04); *Y10T 137/8225* (2015.04)

(58) Field of Classification Search
CPC ......... Y10T 137/0396; Y10T 137/2569; Y10T 137/8158; Y10T 137/8225
See application file for complete search history.

(56) References Cited

U.S. PATENT DOCUMENTS

| | | | |
|---|---|---|---|
| 2,518,894 A * | 8/1950 | Humbarger | F17C 13/045 114/74 A |
| 2,626,628 A * | 1/1953 | Norway | F17C 13/045 137/113 |
| 2,641,273 A * | 6/1953 | Siebens | F17C 13/045 137/113 |
| 5,868,162 A | 2/1999 | Dickerson, Jr. | |
| 6,223,769 B1 | 5/2001 | Bragg et al. | |
| 6,820,647 B1 | 11/2004 | Grecco et al. | |
| 2002/0020444 A1* | 2/2002 | Dickerson, Jr. | F17C 13/045 137/112 |
| 2006/0151027 A1* | 7/2006 | Pearson | F17C 13/025 137/113 |

* cited by examiner

Primary Examiner — R. K. Arundale
(74) Attorney, Agent, or Firm — Hauptman Ham, LLP

(57) ABSTRACT

The invention relates to an automatic cylinder changeover device (1), comprising two gas inlets for mounting gas cylinder banks, namely the left gas inlet and the right gas inlet, a gas outlet through which gas may be discharged and a valve suitable for connecting said left gas inlet or said right gas inlet with the gas outlet and configured for automatically reversible switching between these two connections, characterized in that the device (1) comprises an indicator, suitable for being manually set in one of two distinct positions, one of said positions indicating the left gas inlet and the other of said positions indicating the right gas inlet and comprises means for detecting the position of the indicator, including at least one sensor (5), preferably a pair of sensors (5).
The invention also covers a method for monitoring a gas installation equipped with such automatic cylinder changeover device.

12 Claims, 5 Drawing Sheets

METHOD FOR MONITORING GAS INSTALLATION

CROSS REFERENCE TO RELATED APPLICATION

This application claims the priority of European Patent Application No. EP14461569.7 filed on 23 Sep. 2014, which is incorporated herein by reference in its entirety, in the European Patent and Trademark Office.

TECHNICAL FIELD

The invention is related to gas installations, in which gas is supplied from two cylinders banks each of them comprising one of more gas cylinders. More precisely, the invention relates to an automatic cylinder changeover device (ACO) and to a method for monitoring a gas installation equipped with an automatic cylinder changeover device, said method allowing for identifying the cylinders exchange.

BACKGROUND

Gas installations in which gas is supplied from two gas cylinder banks are known. These two banks are connected to inlets of a device, comprising also a valve and an outlet. For clarity we will distinguish the inlets and banks connected thereto as "left" and "right". From constructional point of view, however, the left inlet and left bank can be (and in most of known devices: is) identical to the right inlet and the right bank.

In use, the situation is as follows: At the beginning the gas cylinders in both banks are full and one of the inlets (and so: one of the banks) is exclusively connected to the outlet. The bank connected to the outlet is referred to as the "primary bank" (also known as the "service bank"), while the other bank is called the "reserve bank".

The connection between one of the gas inlets and the gas outlet can be done in the simplest case by manually setting the valve in a corresponding position (e.g. by turning a knob). More advantageously, an automatic valve is used, which switches from one bank to another when the pressure in the currently connected gas bank drops below the threshold level characteristic for a given device.

Such automatic devices are well known in the art. They may easily be realized electronically (with pressure detectors) or mechanically—by a pressure gas regulator. Devices equipped with such automatic valves are known as automatic cylinder changeover devices (ACO). Both manually controlled and automatic changeover devices allow for replacement of the gas cylinder exhibiting the lower gas pressure or contents (possible and empty cylinder) with the fresh/full one, while another gas bank (reserve bank) is used to supply gas to the installation. This way gas may be constantly supplied to the installation (without breaks), if only gas cylinders are replaced timely.

In order to allow for such timely replacement, especially for gas installations in remote/hardly accessible locations, it is advantageous to monitor the signal indicating occurrence of an automatic changeover of gas banks (this signal is often called a "reserve signal"). To this end, numerous automatic changeover devices equipped with telemetric means have been proposed.

An automatically switching valve with remote signaling is known from the document U.S. Pat. No. 6,763,843 B1.

Another automatically switching valve with remote signaling is described in the document U.S. Pat. No. 5,868,162 A. The valve known from this document measures pressure at an outlet line using an electric, pressure-sensitive switch which can be set to close at a predetermined pressure threshold within relatively narrow tolerances such that a pressure regulator can be placed between the pressurized gas supply tanks and the switching valve. Closing of the pressure-sensitive switch in response to the drop in pressure below the predetermined threshold sends an electric signal to a relay. In response to the electric signal, the relay causes a different inlet line to be selected, thus changing the particular pressurized gas supply from which the outlet line receives pressurized gas. When gas is supplied through a first inlet line, an electric signal from the pressure-sensitive switch causes the relay to toggle to supply gas through a second inlet line. A subsequent signal from the pressure sensitive switch causes the relay to toggle back to again supply gas through the first inlet line. No manual resetting of the switching valve according to the present invention is required. The electric signal of the pressure-sensitive switch also triggers a remote signaling device to signal a remote location. For example, the electric signal can trigger dialing of a predetermined telephone number by an automatic dialer. When connected to the remote location, the dialer can transmit a predetermined message which uniquely identifies a particular pressurized gas dispensing installation as the installation in which an empty pressurized-gas supply is detected.

U.S. Pat. No. 6,223,769 B1 discloses a gas pressure sensor and indicator apparatus for recreational vehicles and the like. According to U.S. Pat. No. 6,223,769 B1, when the supply gas container is at or near empty (i.e. the sensed gas pressure is low), the sensor transmits an output signal to an indicator, such as a lighting element, to notify the user that a changeover to a reserve gas container has occurred and that the initially selected supply container requires refilling.

U.S. Pat. No. 6,820,647 B1 discloses a valve position monitor that provides simultaneous visual and electrical signals of valve position. A method of monitoring the position of a valve by utilizing the valve position monitor described herein is also disclosed. According to U.S. Pat. No. 6,820,647 B1, the device includes at least two trigger housings. Additional trigger housings may be utilized. Each trigger housing contains at least one trigger. More than one trigger on a trigger housing may be included to allow for additional signals. Preferably, the body comprises two trigger housings, each with one trigger that is detected by a limit switch. The triggers may be any inductive, magnetic, mechanical, or electrical trigger which, when detected by a limit switch, is capable of transmitting an electrical signal of valve position. Preferably, the trigger is a magnet.

In automatic changeover devices, when the service bank cannot withstand the gas vapour requirement and the ACO detects pressure drop, it automatically opens reserve bank in order to combine both flow to deliver gas at required pressure on the outlet. That situation typically happens when gas level in service bank is low. In such circumstances, there may arise remarkable fluctuations of the gas level in the reserve bank, lasting for hours or even days. Alternatively, such fluctuations may arise if the gas consumption rate (at the outlet of the automatic changeover device) is too high. In both cases they lead to spontaneous switching back to the primary bank, although the gas in the primary bank has been to large extent consumed, while the gas cylinder(s) in the primary bank has/have been not replaced with fresh/full one(s). The period of unstable indication and switching is called dithering. The ACO indicates with colour indicator on the knob (typically red) that the reserve bank is used (i.e.

connected to the outlet). During dithering, the ACO can temporary switch back and forth between service and reserve mode indicated on the knob. It is impossible to distinguish dithering state from cylinders replacement unless knob position is monitored.

Dithering is illustrated in FIG. 1, which serves to illustrate the technical problem solved by the present invention. In FIG. 1, the gas level in two gas cylinders (namely the primary cylinder and the reserve cylinder) are shown as the function of time (refer to the two lines starting in the upper left-hand side corner of the graph). In addition, a reserve signal (bottom rectangular curve) is shown vs. time. The reserve signal (in this case) is a binary signal indicating that the reserve cylinder is used at a given moment for supplying gas to the installation. Several changeovers between the primary and the secondary cylinders can be observed, while the gas amount in each of them decreases systematically over time and none of the cylinders is empty before the time T4. Moreover, none of them have been replaced with a fresh/full one within the timeframe shown in FIG. 1. Neither there is a need to replace any of them before the time T4, as both still contain considerable amounts of gas.

Specifically, with reference to FIG. 1, the blue line (M1) represents cumulative weight of cylinders with LP gas constituting the service bank (left bank, left OY axis), while the red line (M2) represents cumulative weight of cylinders with LP gas constituting the reserve bank (right bank, right OY axis). The green line/area represents bank selection: if present—only the service bank is used (the left bank in this case); no green area corresponds to the reserve bank (the right bank in this case) also being used. In FIG. 1, it can be observed that:

a) Before T1 gas is consumed from the service bank (left).
b) Between T1 and T2, the gas consumption is significantly increased and since the service bank (left) is close to empty, the reserve bank (right) is opened to vaporization cater for demand on the output of the ACO.
c) Between T2 and T3, the gas consumption is lower and vaporization from service bank (left) is sufficient, therefore the reserve bank (right) is closed.
d) Between T3 and T4, the service bank (left) is practically empty, the reserve bank (right) is open.
e) Between T4 and T5, the gas consumption is stopped and pressure from the remaining gas in the service bank (left) has closed the reserve bank (right).
f) After T5, the service bank (left) is completely empty, the gas consumption is only from the reserve bank (right).

Therefore, it is clear that remote monitoring of the reserve signal, is insufficient for distinguishing between the situation of aforementioned fluctuations (without the replacement of the empty cylinder bank with a fresh/full one, i.e. when the replacement may be still needed or such need should be expected) and the situation in which after the automatic changeover of cylinders, the empty cylinder bank has been replaced with a fresh, full cylinder (and thus the replacement is no longer need or should not be expected soon). Needless to say such distinction is highly desired for hardly accessible gas installations (e.g. installations used in remote locations). The exact information to this end is invaluable from the perspective of gas cylinder delivery planning on one hand and continuous exploitation of the gas installation on the other hand.

Some solutions on how to eliminate the dithering phenomenon are known from commercially available ACO devices. For example, in one of such devices, a magnet is placed on the membrane in the valve and sticks to the valve when the automatic changeover takes place for the first time. Once the magnet sticks to the membrane of the valve—the membrane is stabilized and dithering is eliminated.

None of the aforementioned prior art solutions provides reliable means for detecting whether or not gas cylinder in a depleted gas bank has been replaced or does it still need to be replaced.

SUMMARY

It is thus the object of the present invention to provide an automatic cylinder changeover device allowing for clear distinction between the situation of spontaneous switching back from the reserve cylinder to the primary cylinder due to fluctuations of gas pressure in the reserve cylinder or fluctuations of gas consumption rate at the outlet of the device (while the empty cylinder bank has not been replaced) and the situation in which after the automatic changeover of cylinders, the empty cylinder bank has been replaced with a fresh, full cylinder. The invention also allows to assess the correct replacement process finished by manual set of a dedicated indicator. In the particularly favourable embodiment of the present invention, said dedicated indicator is a knob, set manually by turning.

It is the further object of the present invention to provide a method of monitoring a gas installation equipped with an automatic cylinder changeover device, which method allows for clear distinction between the situation of spontaneous switching back from the reserve cylinder to the primary cylinder due to fluctuations of gas pressure in the reserve cylinder or fluctuations of gas consumption rate at the outlet of the device (while the empty cylinder bank has not been replaced) and the situation in which after the automatic changeover of cylinders, the empty cylinder bank has been replaced with a fresh, full cylinder.

In brief, the aforementioned desired result has been achieved by equipping a state-of-the art automatic cylinder changeover device with an additional indicator and a sensor, allowing for detection of and clear distinction between two positions of said indicator, e.g. a knob, each of said positions corresponding to one of two gas cylinder banks mounted to said automatic cylinder changeover device. For clarity the banks are hereby named "left" and "right", although as mentioned before from technical point of view both banks may be identical. Said additional indicator is suitable for being manually set by an operator (e.g. a person replacing empty gas cylinders) in one of the two positions: one position indicating the left bank (and the left inlet of the automatic cylinder changeover device, ACO) and the other position indicating the right bank (and the right inlet of the ACO). The important feature of invention is that the position of said indicator ("left"/"right"), which can be detected by said sensor, is unrelated to the actual gas bank used as the source of gas for the installation at a given moment ("primary"/"reserve"). So, the changeover of gas cylinders in performed automatically by the changeover device whenever the pressure difference between the primary and the reserve cylinders exceeds a pre-set threshold value. This procedure is completely according to what is known in the art. However, the position of the indicator is only changed manually by an operator, on replacement of an empty cylinder bank with a fresh one. Therefore, monitoring the reserve signal (it can be any signal allowing for detecting that the reserve bank is used as the gas source for the installation at a given moment, in particular: binary signal "reserve?" indicating that the reserve gas bank is used as the source of gas for the installation at a given moment) together with at least one signal related to the position of said indicator allows for distinguishing between dithering and replacement of a gas bank. This is because in the former case, the indicator according to the present invention remains in unchanged position, while in the letter case—it would be switched to its other position by the operator replacing the empty gas cylinder, e.g. by turning the indicator by 180 degrees.

A still more important reason for monitoring the two positions of said indicator is obtaining the information on whether or not a gas cylinder in a depleted gas bank has been correctly replaced. After a correct replacement, the reserve bank becomes the primary bank, while the other bank becomes the reserve bank and should be full. It is always desired to have a full reserve bank after a correct replacement, because then it is known how much gas there is left after the next automatic changeover of cylinders. Consequently, knowing the gas consumption rate, it is possible to forecast (estimate) for how long a particular gas cylinder bank is sufficient.

According to the invention an automatic cylinder changeover device, comprising two gas inlets for mounting gas cylinder banks, namely the left gas inlet and the right gas inlet, a gas outlet through which gas may be discharged and a valve suitable for connecting said left gas inlet or said right gas inlet with the gas outlet and configured for automatically reversible switching between these two connections, is characterized in that the device comprises an indicator, suitable for being manually set in one of two distinct positions, one of said positions indicating the left gas inlet and the other of said positions indicating the right gas inlet and comprises means for detecting the position of the indicator, including at least one sensor, preferably a pair of sensors.

Preferably, the indicator is suitable for being manually set in one of the two distinct positions independently from the position of the valve.

Preferably, the device has means for setting the indicator only in one of the two distinct positions, preferably mechanical means with a spring.

Preferably, said means for detecting the position of the indicator comprises pairs of a first element and a second element, selected from the group of: magnet and magnetic sensor, inductive means and inductive sensor, a pair of contacts, located and configured with respect to each other such that the second means, in particular sensor, can detect the presence of the first element, in particular magnet, when the first element, in particular magnet is close to the second element, in particular sensor.

In such case, preferably, the device has a knob and the first elements, preferably magnets or inductive means are mounted in a ring located under the knob.

Then, preferably, the device has the second elements, preferably magnetic sensors or inductive sensors located under the knob.

Preferably, the device has a knob and at least one, preferably two electrical contact switches are mounted in the device for reading two marginal positions of the knob.

Preferably, the device has a knob and the indicator is integrated with the knob.

In a preferred embodiment, the device according to the invention further comprises transmitting means for transmitting the signal c) and at least one of the signals a) or b), preferably for transmitting the signal c) and at both of the signals a) and b), wherein:

a) is a left inlet signal, preferably a binary signal, containing information whether or not the indicator is in the position indicating the left gas inlet;

b) is a right bank signal, preferably a binary signal, containing information whether or not the indicator is in the position indicating the right gas inlet;

c) is a reserve signal, preferably a binary signal, containing information whether or not the gas outlet is connected to the same gas inlet as indicated by the indicator at a given moment.

According to the invention a method for monitoring a gas installation comprising an automatic cylinder changeover device, the device comprising two gas inlets for mounting gas cylinder banks, namely the left gas inlet and the right gas inlet, a gas outlet through which gas may be discharged and a valve suitable for connecting said left gas inlet or said right gas inlet with the gas outlet and configured for automatically reversible switching between these two connections, the device further comprising an indicator, suitable for being manually set in one of two distinct positions, one of said positions indicating the left gas inlet and the other of said positions indicating the right gas inlet and comprises means for detecting the position of the indicator, including at least one sensor, preferably a pair of sensors, and the device further comprising transmitting means for transmitting the signal c) and at least one of the signals a) or b), preferably for transmitting the signal c) and at both of the signals a) and b), wherein:

a) is a left inlet signal, preferably a binary signal, containing information whether or not the indicator is in the position indicating the left gas inlet;

b) is a right bank signal, preferably a binary signal, containing information whether or not the indicator is in the position indicating the right gas inlet;

c) is a reserve signal, preferably a binary signal, containing information whether or not the gas outlet is connected to the same gas inlet as indicated by the indicator at a given moment.

said method comprising transmitting the signal c) as well as receiving and monitoring this signal, is characterized in that said method comprises in addition transmitting at least one of the signals a) or b) as well as receiving and monitoring this signal, preferably transmitting both of the signals a) and b) as well as receiving and monitoring these signals.

Preferably, the left inlet signal a), the right bank signal b) and the reserve signal c) are binary signals.

Preferably, the left inlet signal a) is true/high if and only if the indicator of the automatic cylinder changeover device is in the position indicating the left gas inlet, while the right inlet signal b) is true/high if and only if the indicator of the automatic cylinder changeover device is in the position indicating the right gas inlet.

Preferably, the method comprises additional step of detecting gas cylinder replacement, namely upon detection of change of value of at least one of, preferably of each of the left inlet signal a) and right inlet signal b) to the opposite, in particular if the left inlet signal a) has changed from true/high to false/low while the right inlet signal b) has changed from false/low to true/high or if the left inlet signal a) has changed from false/low to true/high while the right inlet signal b) has changed from true/high to false/low, the gas cylinder replacement is detected.

Preferably, the reserve signal c) is false/low if and only if the gas outlet is connected to the same gas inlet as indicated by the indicator at a given moment the and gas cylinder replacement is detected if and only if in addition the reserve signal c) has changed to the opposite, in particular if the reserve signal c) has changed from true/high to false/low or from false/low to true/high. This is of course only one possible option, which may be preferred in some circumstances. In other circumstances (e.g. for particular locations) in order to optimize gas cylinders supply, it may be preferred to replace cylinders which are not totally depleted.

BRIEF DESCRIPTION OF THE DRAWINGS

Preferred embodiments of the present invention are presented in a more detailed way with reference to the attached drawing, in which.

DETAILED DESCRIPTION

Preferred embodiments of the invention are described in details below. The examples serve only as an illustration and do not limit the scope of the present invention.

Example

Figure 2:
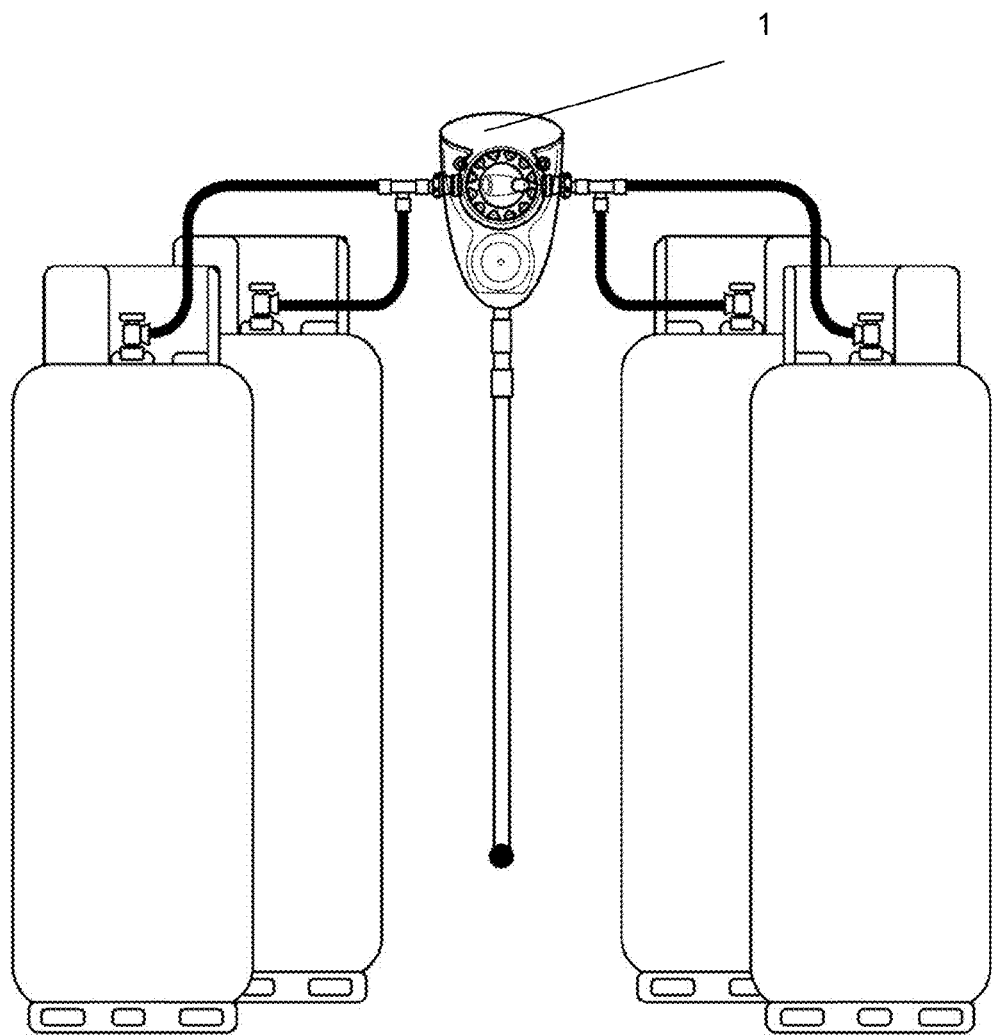
FIG. 2 shows an example gas installation comprising an automatic cylinder changeover device according to the invention.
Figure 3:
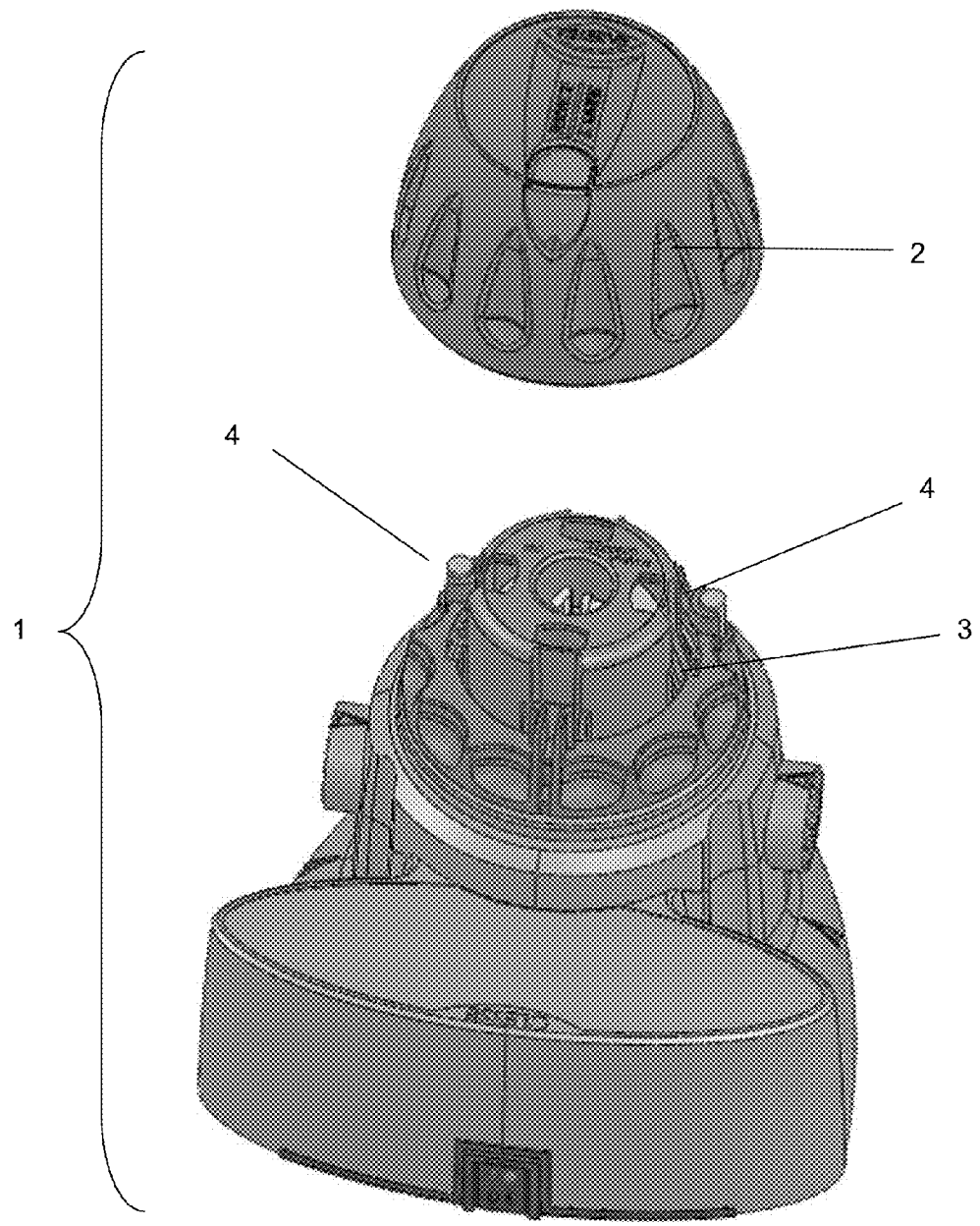
FIG. 3 shows an exploded view of an automatic cylinder changeover device according to the present invention.
Figure 4:
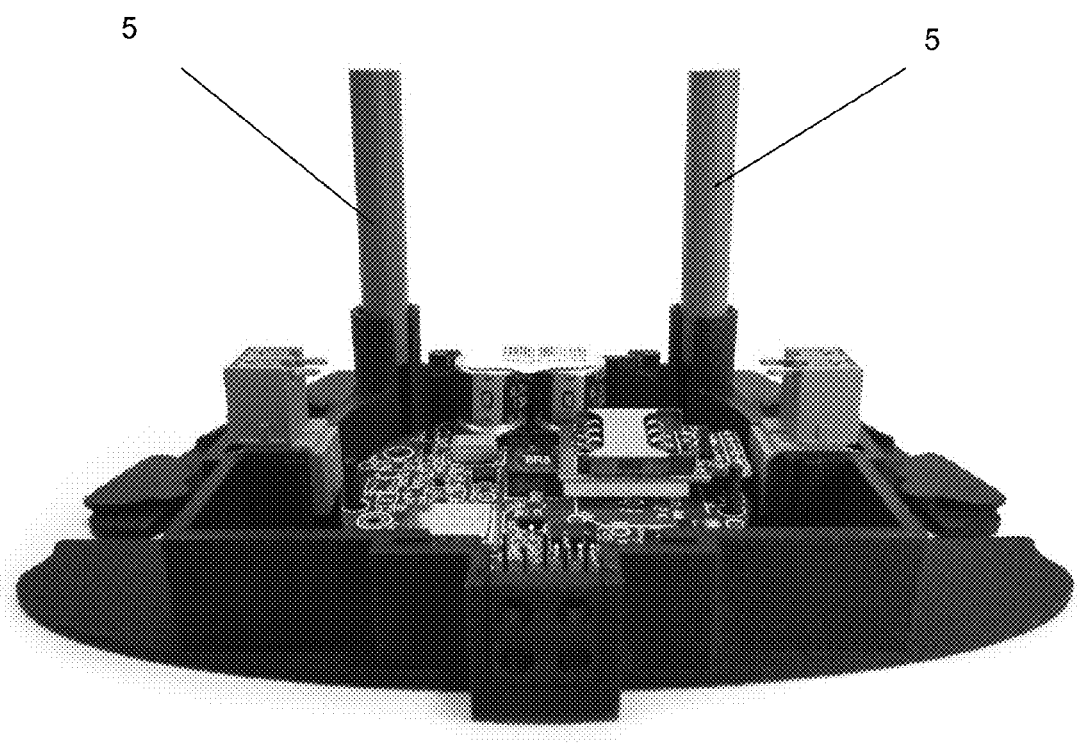
FIG. 4 shows a photograph of a prototype of an automatic cylinder changeover device according to the present invention (bottom view) and FIG. 5 presents a graph illustrating an embodiment of a method according to the present invention.

Specific description of a preferred embodiment of an automatic cylinder changeover device according to the present invention refers to FIGS. 2, 3 and 4. The automatic cylinder changeover device 1 is typically used in gas installations like the one shown schematically in FIG. 2, where two gas cylinder banks (i.e. the left bank and the right bank) of two gas cylinders each are connected respectively to two inlets of the device 1. The device 1 has the ability of selectively connecting one of these two banks/inlets with a gas outlet. Change of the currently connected gas bank occurs automatically as the result of difference of gas pressure between the left bank and the right bank. This functionality is typical for an automatic cylinder changeover device and is not an element of the present invention.

The automatic cylinder changeover device 1 shown in FIG. 3 has a manually set dedicated indicator in the form of a knob 2, which indicates one of the inlets/banks (e.g. left). It is assumed here that the bank indicated is the primary (service) bank, while the other bank is the reserve bank (however, this assumption is not critical for the present invention, which can be arranged also based on exactly opposite assumption). There is also a marker on the knob 2, typically displaying red colour if the reserve gas cylinder bank is used as the current source of gas and displaying other colour (e.g. white) otherwise. In addition to the marker being red, the device 1 has contact switches, other electrical switches or other known technical means for generating a signal corresponding to the fact, the reserve gas cylinder bank used as the current source of gas ("reserve signal"). Further, the device 1 has transmission means, known in the art, for transmitting that information to a remote location.

In FIG. 3, an otherwise known in the art automatic cylinder changeover device 1 having a knob 2 has been equipped with a plastic ring 3 with two magnets 4, wherein said ring is suitable for being placed inside the knob 2. On the bottom side of the device 1, under the knob 2, two sensors 5 (in this case: magnetic sensors) have been mounted in the two column-like structures, as seen in the picture in FIG. 3. The magnets 4 in the ring 3 and the sensors 5 are located with respect to one another such that they allow for detecting the position of the knob 2 and clearly distinguish between two positions of the knob 2, one indicating the primary bank and the other indicating the reserve. Thus, the ring 3 with magnets 4 and the sensors 5 form an indicator according to the present invention. The signal from the two sensors 5 is transmitted along with the reserve signal to a monitoring station, using the telemetric transmission means installed in the automatic cylinder changeover device 1.

In the very favourable embodiment of the inventive device 1 presented here the indicator is integrated with the knob 2. This is not an indispensable feature of the present invention, but a very favourable one, because integration of the indicator with the knob allows for immediate application of the present invention in automatic changeover devices offered in the market.

Also, in the favourable embodiment of the inventive device 1 presented here the indicator is equipped with two magnets 4 and two sensors 5 for detecting the position of the indicator. But it is also possible to detect only one position of the indicator, possibly by using only one magnet 4 and one sensor 5 and assume that if the indicator is not in the detected position—then it must be in the other position. Such assumption is fully justified if the indicator according to the invention is connected or integrated with a device which allows for only two distinct stable positions of the indicator. It means that if the indicator is not set exactly in one of its stable positions by an operator—it will be forced to the other stable position. This is easy to achieve by means well known in the art, e.g. by a mechanical device with a spring).

A skilled person would immediately recognize that the type of sensors mentioned in the recent paragraphs with respect to the embodiment shown in FIG. 3 (i.e. magnets 4 and magnetic sensors 5) are only examples and that the present invention can be realized using any suitable pair of sensors well known in the art. Examples of such pairs include inductive means and inductive sensors, magnets and contact switches, or even electric switches, if only they are located and configured with respect to each other such that detection of the position of the indicator is enabled. To this end it should be mentioned that the location of magnets 4 and sensors 5 in the embodiment shown in FIG. 3 is only given by way of example. Other locations are possible. For example, the magnets 4 can be mounted directly to the knob 2. Or the magnets 4 and sensors 5 in this embodiment are swapped with respect to what is shown in FIG. 3.

Figure 1:
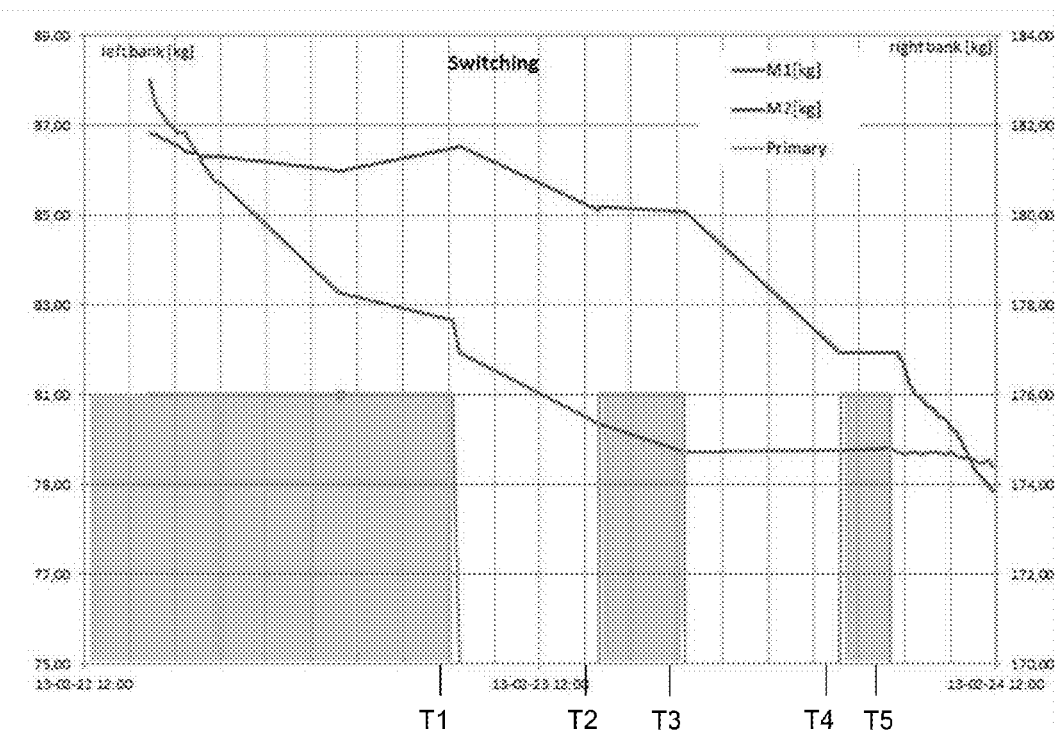
FIG. 1 presents a graph illustrating the technical problem solved by the present invention ("dithering")

The inventive method provides the following: The signals transmitted to the monitoring station are in the present case three binary signals: a) information whether or not the indicator (and so: the knob) is in the position corresponding to the left bank (in short: the left bank signal or the left inlet signal); b) information whether or not the indicator (and so: the knob) is in the position corresponding to the right bank (in short: the right bank signal or the right inlet signal); c) information whether or not the gas outlet is connected to the same gas inlet as indicated by the indicator at a given moment (in short: the reserve signal). It is known that the reserve signal may fluctuate in time when the gas pressure in the primary bank is low or if gas consumption at the outlet of the device 1 is very high. This may lead to automatic changeover of gas cylinders—from left to right and back, without any of them being actually empty (dithering, see FIG. 1 and its description above). However, if the reserve signal is analysed together with the left bank signal and the right bank signal, one may easily distinguish between such fluctuations and actual replacement of an (almost) empty gas cylinder in one of the banks with a fresh (full) one. Consequently, the invention contributes to proper cylinder replacement procedure. To this end, the inventors note that it is preferred (although not completely obligatory) to monitor both the left bank signal and the right bank signal at any moment. These two signals should be consistent, i.e. if one of them is true/high—the other should be false/low and vice versa. This means that the inventive indicator mounted in the knob 2 is precisely in one of the two positions, corresponding to the left bank or the right bank) and not in any intermediate position between those two (which may actually indicate an erroneous cylinder replacement procedure). So, by monitoring the left bank signal and the right bank signal the position of the indicator is known without doubts. If true/high reserve signal is noticed, this means a changeover (switch) from the left bank to the right bank. If, later, the reserve signal turns to false/low without change in the left bank signal and right bank signal—this means a fluctuation (spontaneous switching back to primary cylinder) has been observed, without the primary gas cylinder being actually replaced with a fresh/full one. If, however, the reserve signal turns to false/low following a change in the left bank signal and right bank signal—this means the primary gas cylinder has been replaced with a fresh/full one by an operator, who also changed the position of the indicator. The three aforementioned signals (or: any of them) do not actually have to be binary signals and the inventive method could still be carried out using other signals, as long as they carry the aforementioned information, associated with each signal. According to the inventive method, the signals a), b) and c) are transmitted by transmitting means to a location, where they are received and monitored. It should be noted, however, that the physical distance between the location of the ACO device according to the invention and the location where the signals are monitored is not limited at all in the present invention. Namely, the signal may be transmitted over many kilometers to a remote monitoring station (e.g. in another town—remote location), but it can equally be transmitted by local wireless transmitting means from the basement of a house, where the gas installation is located to the living room of the house, where information is displayed for the house owner.

Less favourably it is possible that only one of the left bank signal and the right bank signal is monitored together with the reserve signal. In such case it is advantageous to use the inventive indicator together with a device which allows for only two distinct stable positions of the indicator, as mentioned above.

The transmission means for transmitting the aforementioned signals a), b) and c) are standard and well known to those skilled in art. They include, but are not limited to, radio transmitters or mobile text/GPRS/SMS communication devices. It is very important and advantageous that no other modification to the device 1 is required. In particular, no switch or electrical cables need to be installed in the device 1. It makes the present invention very robust, suitable for immediate application in many types of existing automatic cylinder changeover devices and resistant to damages.

Figure 5:
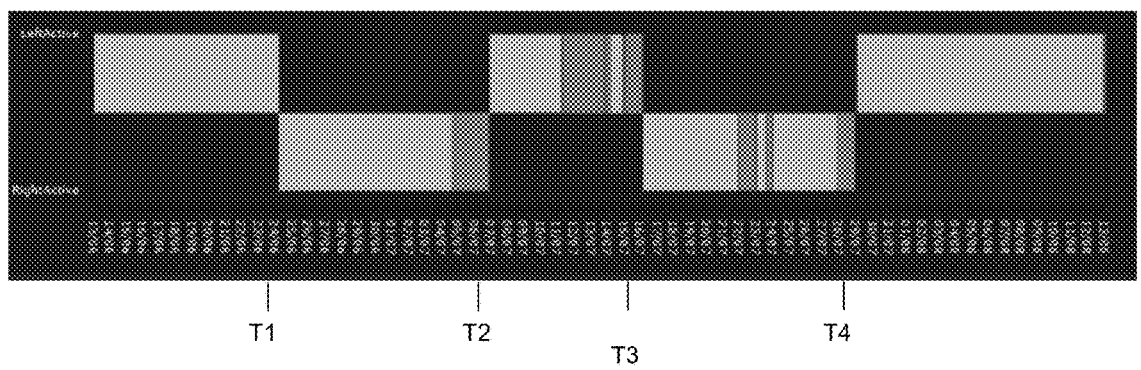

An embodiment of the method according to the present invention is described below with reference to FIG. 5. FIG. 5 illustrates a preferred example of a real change over operation as presented in a web application. The chart in FIG. 5 represents information provided by the method according to the invention. Upper bar corresponds to gas consumption from the left cylinder. Lower bar corresponds to gas consumption from the right cylinder. Green (lighter) fields correspond to gas consumption from the primary cylinder. Red (darker) fields correspond to gas consumption from the reserve cylinder.

a) At T1 cylinder replacement is performed without prior reserve state.
b) At T2 cylinder replacement is performed after reserve state without dithering.
c) At T3 cylinder replacement is performed after dithering.
d) At T4 cylinder replacement is performed after incidental dithering and separate reserve state without dithering.

An additional advantage of the present invention is that it allows for optimal usage (consumption) of gas from a particular cylinder, until the cylinder is empty or almost empty.

The embodiment described here refers precisely to an automatic cylinder changeover device having one gas outlet (through which the gas is consumed) and two inlets, through which the gas may be supplied (namely the left inlet connected to the left bank and the right inlet connected to the right bank). However, it is expected that the crucial idea of the present invention, namely of providing to the changeover device an additional indicator of gas banks, suitable for manual setting and whose position is detectable by appropriate sensor(s) and is unrelated to the gas bank being used as the gas source at a given moment, can be easily applied to automatic cylinder changeover devices with more than two inlets and/or more than one outlet, as these parameters are not connected with the manual indicator, according to the present invention.

Also, clearly the most preferred embodiment of the invention is the one in which the reserve signal and the signals corresponding to the position of the inventive indicator are suitable for telemetric (e.g. transmitted by radio waves). Thanks to such arrangement the whole gas installation can be monitored remotely and fresh/full gas cylinders for replacement may be shipped timely, whenever needed and only when needed. However, one can easily imagine embodiments the signals corresponding to the position of the inventive indicator are in addition to telemetric or instead of telemetric suitable for being observed locally, e.g. by the user of the gas installation. To this end, the inventive indicator may have its two position clearly visible and described/numbered accordingly and/or it can be equipped with a beeper, flashing light or other indicating means known in the art.

The invention claimed is:

1. A method for monitoring a gas installation comprising an automatic cylinder changeover device (1) comprising:
    a left gas inlet and a right gas inlet, for mounting gas cylinder banks;
    a gas outlet through which gas is configured to be discharged;
    a valve for connecting said left gas inlet or said right gas inlet with the gas outlet and configured for automatically reversible switching between these two connections;
    an indicator for being manually set in one of two distinct positions, one of said positions indicating the left gas inlet and the other of said positions indicating the right gas inlet, and comprising means for detecting the position of the indicator, including at least one sensor (5); and
    transmitting means for transmitting a signal c) and at least one of a signal a) and a signal b), wherein:
- the signal a) is a left inlet signal a), containing information whether or not the indicator is in the position indicating the left gas inlet;
- the signal b) is a right bank signal b), containing information whether or not the indicator is in the position indicating the right gas inlet; and
- the signal c) is a reserve signal c), containing information whether or not the gas outlet is connected to the same gas inlet as indicated by the indicator at a given moment, the method comprising:
- transmitting the signal c) as well as receiving and monitoring this signal; and
- transmitting the at least one of the signals a) or b) as well as receiving and monitoring the at least one of the signals a) or b).

2. The method according to claim 1, wherein the left inlet signal a), the right bank signal b) and the reserve signal c) are binary signals.

3. The method according to claim 2, wherein the left inlet signal a) is true/high when the indicator of the automatic cylinder changeover device (1) is in the position indicating the left gas inlet, while the right inlet signal b) is true/high when the indicator of the automatic cylinder changeover device (1) is in the position indicating the right gas inlet.

4. The method according to claim 3, the method further comprises detecting gas cylinder replacement.

5. The method according to claim 4,
wherein the reserve signal c) is false/low when the gas outlet is connected to the same gas inlet as indicated by the indicator at the given moment, and
wherein the gas cylinder replacement is detected when the reserve signal c) has changed to the opposite.

6. The method according to claim 1, wherein the at least one sensor (5) comprises a pair of sensors (5).

7. The method according to claim 1,
wherein the transmitting means transmits the signal c) and both of the signals a) and b), and
wherein the transmitting the at least one of the signals a) or b) comprises transmitting the both of the signals a) and b) as well as receiving and monitoring the both of the signals a) and b).

8. The method according to claim 4, wherein the detecting the gas cylinder replacement comprises:
detecting the gas cylinder replacement upon detection of change of value of at least one of the left inlet signal a) and the right inlet signal b) to the opposite.

9. The method according to claim 4, wherein the detecting the gas cylinder replacement comprises:
detecting the gas cylinder replacement upon detection of change of value of each of the left inlet signal a) and right inlet signal b) to the opposite.

10. The method according to claim 4, wherein the detecting the gas cylinder replacement comprises:
detecting the gas cylinder replacement when the left inlet signal a) has changed from true/high to false/low while the right inlet signal b) has changed from false/low to true/high.

11. The method according to claim 4, wherein the detecting the gas cylinder replacement comprises:
detecting the gas cylinder replacement when the left inlet signal a) has changed from false/low to true/high while the right inlet signal b) has changed from true/high to false/low.

12. The method according to claim 5, wherein the gas cylinder replacement is detected when the reserve signal c) has changed from true/high to false/low or from false/low to true/high.

* * * * *